(12) United States Patent
Li et al.

(10) Patent No.: US 8,643,753 B2
(45) Date of Patent: Feb. 4, 2014

(54) IMAGE PICKUP APPARATUS AND METHOD THEREOF

(75) Inventors: Chung-Chi Li, Taipei (TW); Ka-Yi Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 13/025,179

(22) Filed: Feb. 11, 2011

(65) Prior Publication Data

US 2012/0154654 A1 Jun. 21, 2012

(30) Foreign Application Priority Data

Dec. 20, 2010 (TW) ................................ 99144834 A

(51) Int. Cl.
*H04N 5/335* (2011.01)

(52) U.S. Cl.
USPC ............ 348/302; 348/284; 348/299; 348/300

(58) Field of Classification Search
USPC ................... 348/302, 284, 299, 300; 341/126
See application file for complete search history.

(56) References Cited

U.S. PATENT DOCUMENTS

| | | | |
|---|---|---|---|
| 6,288,387 B1 | 9/2001 | Black et al. | |
| 6,388,706 B1 | 5/2002 | Takizawa et al. | |
| 6,642,496 B1 | 11/2003 | Gulbransen | |
| 7,280,146 B2 | 10/2007 | Takahashi et al. | |
| 7,408,576 B2 | 8/2008 | Pinto et al. | |
| 7,453,502 B2 | 11/2008 | Schweng | |
| 2006/0192859 A1 | 8/2006 | Sasaki | |
| 2008/0055446 A1 | 3/2008 | Hunter et al. | |
| 2008/0063294 A1* | 3/2008 | Burt et al. | 382/255 |
| 2008/0259194 A1 | 10/2008 | Silverstein | |
| 2008/0273103 A1 | 11/2008 | Pinto et al. | |
| 2009/0147110 A1* | 6/2009 | Muramatsu et al. | 348/255 |
| 2009/0190006 A1* | 7/2009 | Huggett et al. | 348/241 |
| 2009/0213243 A1 | 8/2009 | Funamoto | |
| 2009/0268053 A1 | 10/2009 | Wang et al. | |
| 2010/0276572 A1* | 11/2010 | Iwabuchi et al. | 250/208.1 |
| 2011/0090242 A1* | 4/2011 | Cote et al. | 345/597 |

FOREIGN PATENT DOCUMENTS

TW 200903307 1/2009

OTHER PUBLICATIONS

Mutoh et al., "Three-Dimensional Wave Optical Simulation for Image Sensors by Localized Boundary Element Method", IEEE Transactions on Electron Devices, vol. 56, No. 11, Nov. 2009, pp. 2473-2480.

(Continued)

*Primary Examiner* — Roberto Velez
*Assistant Examiner* — Yih-Sien Kao
(74) *Attorney, Agent, or Firm* — Jianq Chyun IP Office

(57) ABSTRACT

An image pickup apparatus and a method thereof are provided. The apparatus includes a sensor array and an ADC array. The sensor array includes M×N sensor blocks SB(i,j). The sensor block includes P×Q image sensing elements Se(x, y). The ADC array is located at another side of the illuminated side of the sensor array. The ADC array includes M×N ADCs ADC(i,j). The ADC(i,j) coupled to the sensor block SB(i,j) obtains the image data Data(x,y) from the image sensing element Se(x,y) of the sensor block SB(i,j). The ADC(i,j) evaluates the gain G(x,y) based on the position of the image sensing element Se(x,y). The compensated image data Datacom(x,y) can be outputted and Datacom(x,y)=Data(x,y)×G(x,y). The image pickup apparatus could improve the optical shading problem.

7 Claims, 9 Drawing Sheets

(56) References Cited

OTHER PUBLICATIONS

Kashitani et al., "Investigation of visualization characteristics of the sharp focusing schlieren method", 21st International Congress on Instrumentation in Aerospace Simulation Facilities, 2005., IEEE, pp. 9-16.

Dan B Goldman, "Vignette and Exposure Calibration and Compensation", IEEE Transactions on Pattern Analysis and Machine Intelligence, vol. 32, Mar. 18, 2010, pp. 1-13.

* cited by examiner

FIG. 4

IMAGE PICKUP APPARATUS AND METHOD THEREOF

CROSS-REFERENCE TO RELATED APPLICATION

This application claims the priority benefit of Taiwan application serial no. 99144834, filed on Dec. 20, 2010. The entirety of the above-mentioned patent application is hereby incorporated by reference herein and made a part of this specification.

TECHNICAL FIELD

The disclosure relates generally to an image sensing apparatus. More particularly, the disclosure relates to an image pickup apparatus.

BACKGROUND

Nowadays, as electronic product designs reveal a trend towards light weight, thinness and compactness, the optical shading problem in an image pickup apparatus has become more and more severe. Optical shading refers to an angular variation of a light illuminating through a lens on an image sensor which causes a smaller reading from a corner region of the image sensor than from a central region. In a CMOS image sensor adapted for a fixed-focus lens, for example, as the fixed-focus lens gets closer to the image sensor, an included angle formed by a corner and a normal of the center of the image sensor increases, and accordingly the optical shading phenomenon becomes more severe.

The optical shading phenomenon is directly proportional, approximately, to the fourth power of the cosine ($\cos^4 \theta$) of the included angle formed by the image sensor normal and a line connecting the pixels on the image sensor and the center of the lens. Due to the nonlinearity of this function, compensation using circuit frameworks employing conventional column analog-to-digital converters (ADCs) or chip level ADCs is difficult. Nevertheless, after the data outputted from the image sensor has been converted into a digital image, back-end digital signal processing (DSP) may be employed to mitigate the optical shading problem, for example by searching a look-up table for the compensating gain of each pixel position. However, when the pixel quantity or the image refresh rate increase, the impact of an image output due to the lengthy signal processing time needed for the massive amount of calculations involved may happen.

SUMMARY

An exemplary embodiment of an image pickup apparatus including a sensor array and an analog-to-digital converter (ADC) array is introduced herein. The sensor array includes M×N sensor blocks indicated by SB(i,j). Each of the sensor blocks includes P×Q image sensing elements indicated by Se(x,y), in which M and N are integers greater than 1, P, Q, i, j, x, and y, are integers greater than or equal to 1, i is less than or equal to M, j is less than or equal to N, x is less than or equal to P, and y is less than or equal to Q. The ADC array is located at another side of an illuminated side of the sensor array. The ADC array includes M×N analog-to-digital converters indicated by ADC(i,j), and the analog-to-digital converter ADC(i,j) is coupled to the sensor block SB(i,j). The analog-to-digital converter ADC(i,j) obtains an image data Data(x,y) from the image sensor element Se(x,y) of the sensor block SB(i,j), evaluates a gain G(x,y) based on the position of the image sensor element Se(x,y), and outputs a compensated image data $Data_{com}(x,y)$, in which $Data_{com}(x,y)=Data(x,y) \times G(x,y)$.

Another exemplary embodiment of an image pickup apparatus including an image pickup layer and an analog-to-digital conversion layer is introduced herein. The image pickup layer includes a plurality of image pickup areas, and each of the image pickup areas includes a plurality of image sensing elements. The analog-to-digital conversion layer is located at another side of an illuminated side of the image pickup layer, and the analog-to-digital conversion layer includes a plurality of ADCs. Each of the ADCs is coupled to one of the image pickup areas, and each of the ADCs obtains an image data from the image sensing element in the coupled image pickup area. Moreover, each of the ADCs evaluates a gain based on the position of the image sensing element obtaining the image data, and multiplies the image data by the gain, so as to obtain a compensated image data.

Another exemplary embodiment of an image pickup method is introduced herein. The method includes step to provide an image pickup layer and an analog-to-digital conversion layer. The image pickup layer includes a plurality of image pickup areas, and each of the image pickup areas includes a plurality of image sensing elements. The analog-to-digital conversion layer includes a plurality of ADCs. In addition, the analog-to-digital conversion layer is disposed at another side of an illuminated side of the image pickup layer, and the analog-to-digital conversion layer is coupled to the image pickup layer. Each of the ADCs obtains an image data from the image sensing element in the coupled image pickup area. A gain is evaluated based on the position of the image sensing element obtaining the image data. The image data is multiplied by the gain, so as to obtain a compensated image data.

Another exemplary embodiment of an image pickup method is introduced herein. The method includes step to provide a sensor array and an ADC array. The sensor array includes M×N sensor blocks indicated by SB(i,j). Each of the sensor blocks includes P×Q image sensing elements indicated by Se(x,y), in which M and N are integers greater than 1, P, Q, i, j, x, and y are integers greater than or equal to 1, i is less than or equal to M, j is less than or equal to N, x is less than or equal to P, y is less than or equal to Q, and the ADC array includes M×N analog-to-digital converters indicated by ADC (i,j).

The ADC array is disposed at another side of an illuminated side of the sensor array, and the analog-to-digital converter ADC(i,j) is coupled to the sensor block SB(i,j). Moreover, analog-to-digital converter ADC(i,j) obtains an image data Data(x,y) from the image sensing element Se(x,y) of the sensor block SB(i,j). A gain G(x,y) is evaluated based on the position of the image sensing element Se(x,y). A compensated image data $Data_{com}(x,y)$ is outputted, in which $Data_{com}(x,y)=Data(x,y) \times G(x,y)$.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

FIG. 4 is a schematic diagram of a bi-linear interpolation method according to an exemplary embodiment.

DESCRIPTION OF EMBODIMENTS

Figure 1:
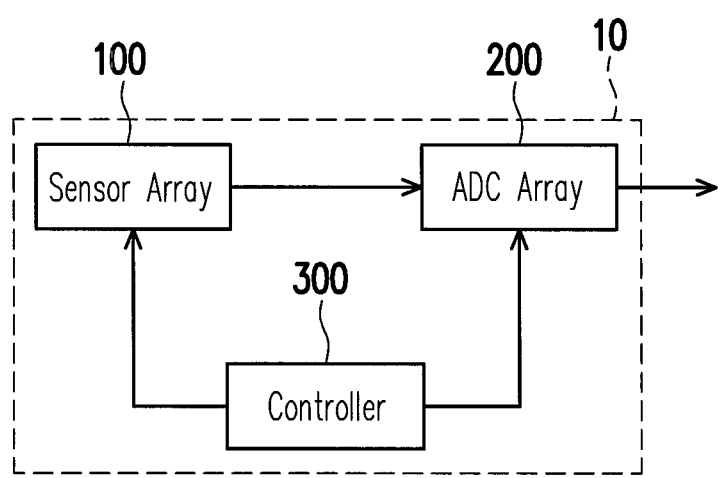
FIG. 1 is a block diagram of an image pickup apparatus according to an exemplary embodiment.

An image pickup apparatus capable of improving optical shading is disclosed herein. Please refer to FIG. 1 for the description hereafter, in which FIG. 1 is a block diagram of an image pickup apparatus according to an exemplary embodiment. An image pickup apparatus 10 includes a sensor array 100, an analog-to-digital converter (ADC) array 200, and a controller 300. The ADC array 200 is located at another side of an illuminated side of the sensor array 100. The sensor array 100 includes M×N sensor blocks which may be indicated by SB(i,j). Each of the sensor blocks includes P×Q image sensing elements which may be indicated by Se(x,y), in which M and N are integers greater than 1, P, Q, i, j, x, and y are integers greater than or equal to 1, i is less than or equal to M, j is less than or equal to N, x is less than or equal to P, and y is less than or equal to Q. The ADC array 200 includes M×N analog-to-digital converters which may be indicated by ADC (i,j). The analog-to-digital converter ADC(i,j) is coupled to the sensor block SB(i,j).

Figure 2A:
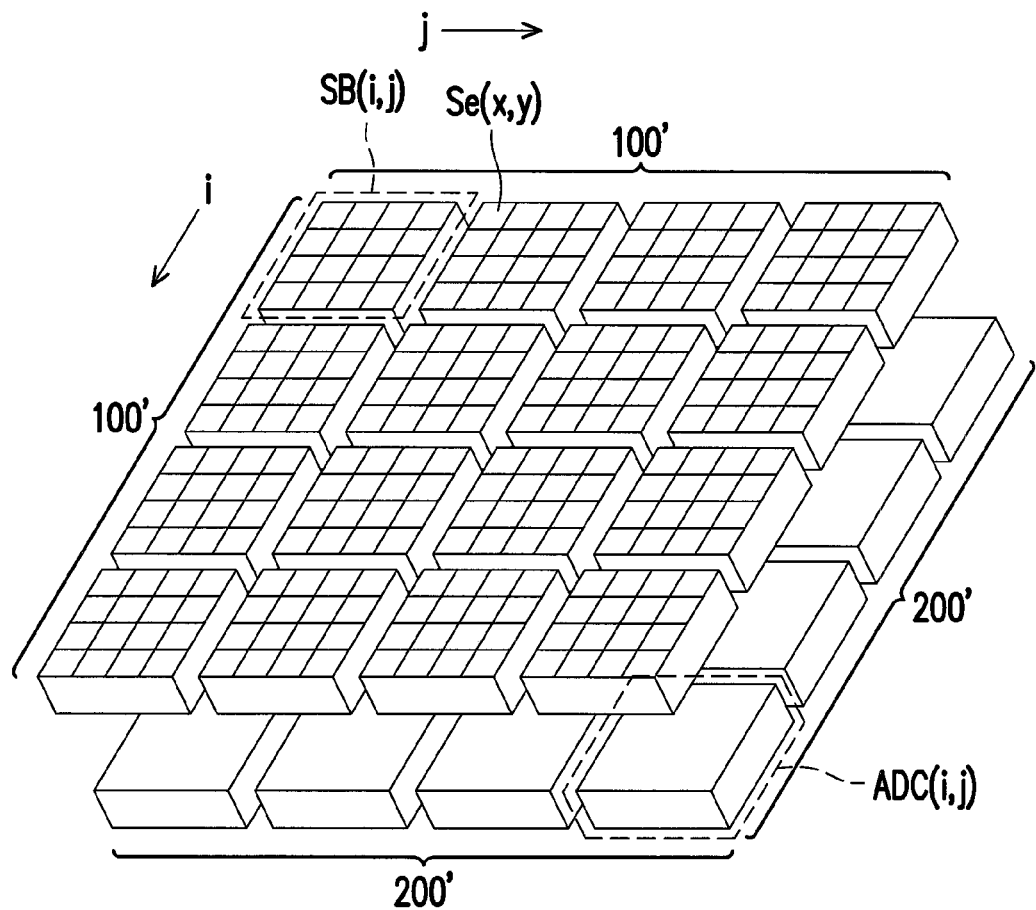
FIG. 2A is a schematic perspective diagram of an image pickup apparatus according to an exemplary embodiment.
Figure 2B:
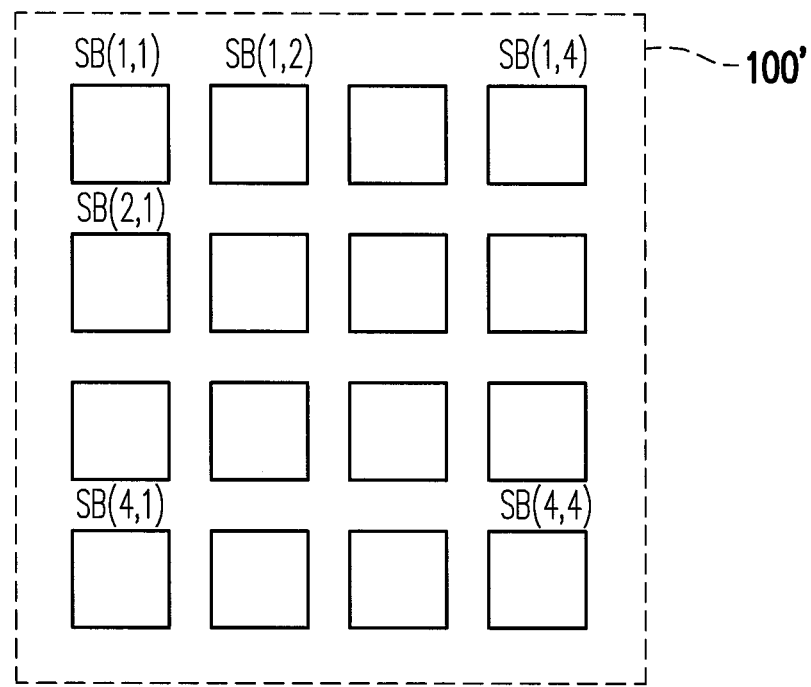
FIG. 2B is a schematic diagram illustrating the reference labels of the sensor array depicted in FIG. 2A.
Figure 2C:
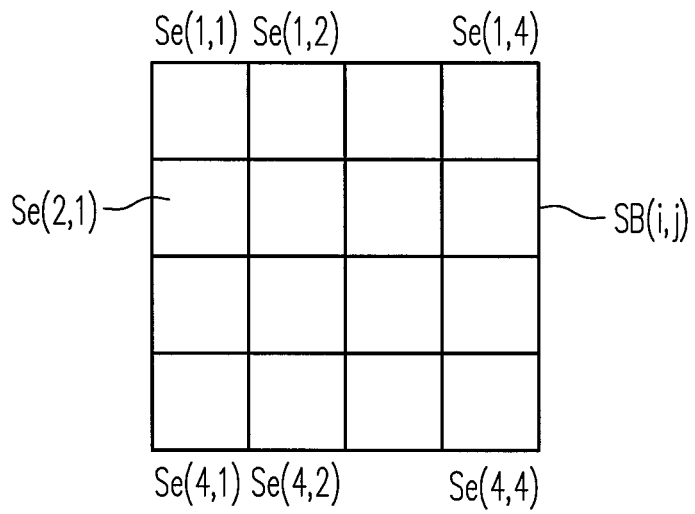
FIG. 2C is a schematic diagram illustrating the reference labels in any one of the sensor blocks SB(i,j).
Figure 2D:
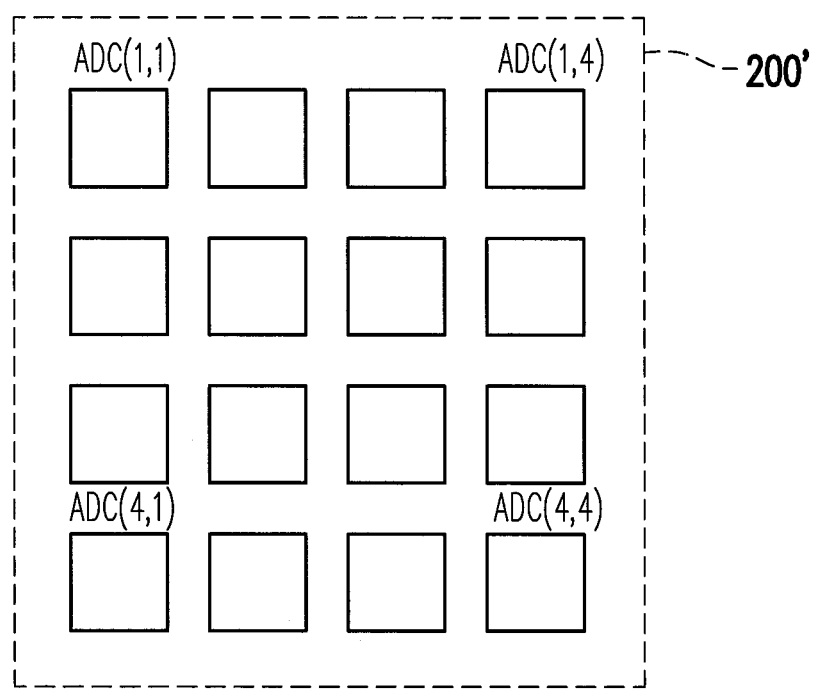
FIG. 2D is a schematic diagram illustrating the reference labels in the ADC array depicted in FIG. 2A.

For example, FIG. 2A is a schematic perspective diagram of an image pickup apparatus according to an exemplary embodiment. Please refer to FIGS. 1 and 2A in the description hereafter. An image pickup apparatus includes a sensor array 100' and an ADC array 200'. FIG. 2B is a schematic diagram illustrating the reference labels of the sensor array depicted in FIG. 2A. Please refer to FIGS. 2A and 2B in the description hereafter. The sensor array 100' includes 4×4 sensor blocks SB(i,j) (i.e., M=4, N=4, i<4, and j<4), in which i represents the $i^{th}$ row counting vertically, and j represents the $j^{th}$ column counting horizontally. FIG. 2C is a schematic diagram illustrating the reference labels in any one of the sensor blocks SB(i,j). Please refer to FIGS. 2B and 2C in the description hereafter. Each of the sensors SB(i,j) further includes 4×4 image sensing elements Se(x,y) (i.e., P=4, Q=4, x≤4, and y≤4). FIG. 2D is a schematic diagram illustrating the reference labels in the ADC array depicted in FIG. 2A. Please refer to FIGS. 2A and 2D in the description hereafter. The ADC array 200' includes 4×4 analog-to-digital converters ADC(i,j) (i.e., i≤4 and j≤4). However, the disclosure should not be construed as limited thereto. In other embodiments, the magnitudes of M, N, P, and Q may be defined as required in actual situations.

Figure 3A:
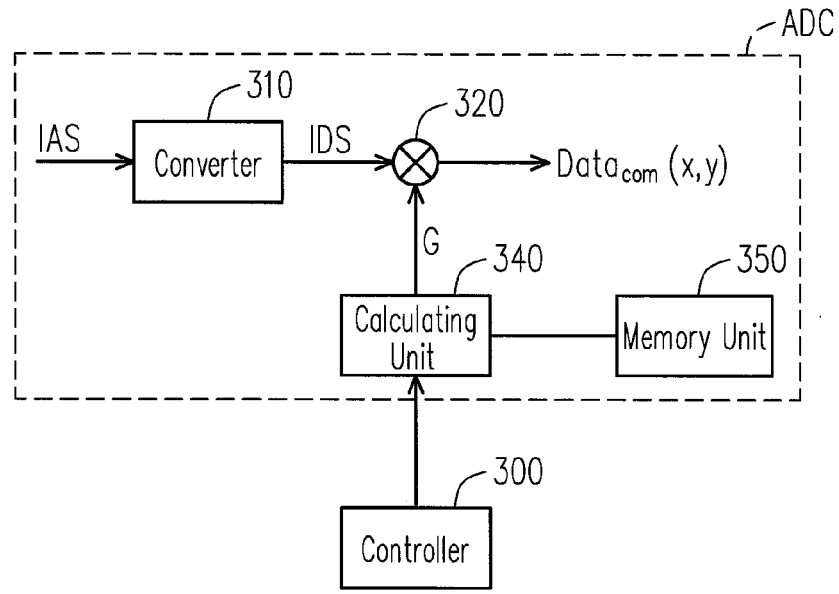
FIG. 3A is a block diagram of an analog-to-digital converter ADC according to an exemplary embodiment.

FIG. 3A is a block diagram of an analog-to-digital converter ADC according to an exemplary embodiment. The analog-to-digital converter ADC includes a converter 310, a multiplier 320, a calculating unit 340, and a memory unit 350. The converter 310 may receive an analog image signal IAS so as to output a digital image signal IDS. Moreover, the controller 300 is coupled to the calculating unit 340. The calculating unit 340 is coupled to the memory unit 350 and outputs a gain G. The multiplier 320 receives the digital image signal IDS and the gain G so as to output a compensated data $Data_{com}(x,y)$.

Figure 3B:
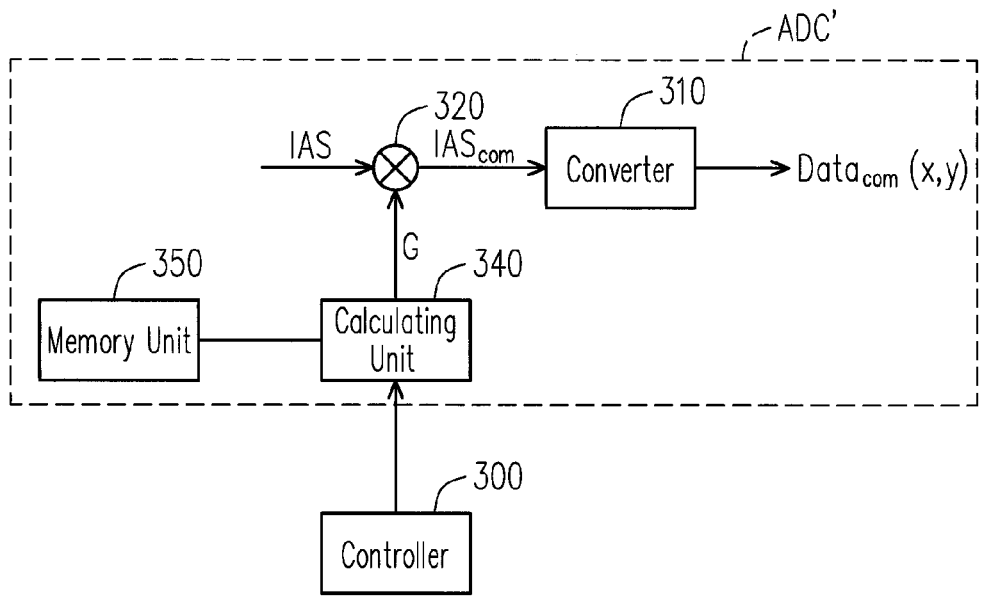
FIG. 3B is a block diagram of an analog-to-digital converter ADC' according to an exemplary embodiment.

FIG. 3B is a block diagram of an analog-to-digital converter ADC' according to an exemplary embodiment. The analog-to-digital converter ADC' includes the converter 310, the multiplier 320, the calculating unit 340, and the memory unit 350. The calculating unit 340 is coupled to the memory unit 350 and the controller 300 and outputs a gain G. The multiplier 320 outputs a compensated analog image signal $IAS_{com}(x,y)$ after receiving the analog image signal IAS and the gain G. The converter 310 receives the compensated analog image signal $IAS_{com}(x,y)$ so as to output the compensated data $Data_{com}(x,y)$.

The memory unit 350 is adapted for storing the gain G(g,h) of the image sensing element Se(g,h) corresponding to the predetermined positions in the sensor block SB(i,j), in which g and h are integers greater than or equal to 1, g is less than or equal to P, and h is less than or equal to Q. For example, there may be four memory units. In another example, these four memory units are used to store four gains G(1,1), G(P,1), G(1,Q), and G(P,Q) of the image sensing elements Se(1,1), Se(P,1), Se(1,Q), and Se(P,Q) corresponding to the four corners of the sensor block SB(i,j). However, the quantity of the memory unit described in the disclosure is not limited thereto. For example, only one set of memory units may be included but the quantity of the memory units is not limited, and the memory units are used to store the related predetermined parameters corresponding to the position of the sensor block SB(i,j).

The calculating unit 340 may evaluate the gain at different image locations according to an x position and an y-position of the image sensing element Se(x,y). More specifically, the gain corresponding to different positions may be obtained by calculation using shift adders and adders according to the x and y positions and the gain G(g,h) stored in the memory unit 350 corresponding to the predetermined positions. An evaluation method may be a bi-linear interpolation method, a bi-cubic method, or other suitable methods, and the calculating unit may be implemented by a plurality of shift adders and adders.

Figure 4:
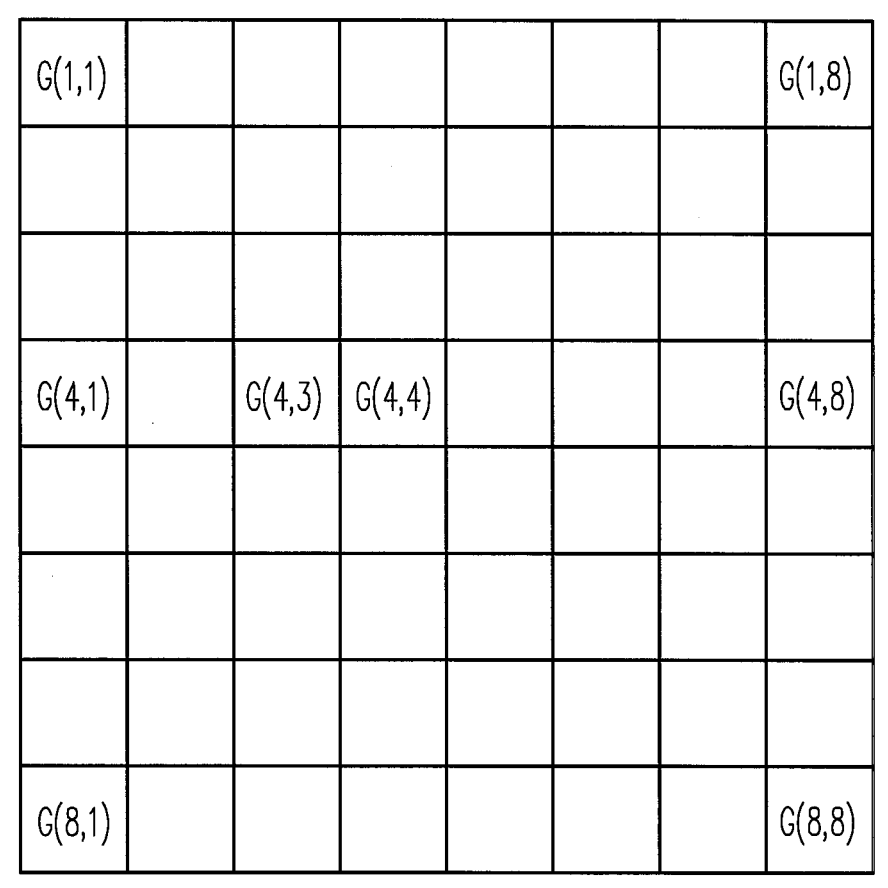

For example, FIG. 4 is a schematic diagram of a bi-linear interpolation method according to an exemplary embodiment. Please refer to FIGS. 3A, 3B, 4, and 5 in the description hereafter, in which a sensor block having 8×8 image sensing elements is used as an example. As shown in FIG. 4, the memory unit 350 includes four gains G(1,1), G(1,8), G(8,1), and G(8,8), respectively, of the predetermined positions, and the gains G(4,1), G(4,3), G(4,4), and G(4,8) at four positions are desired. According to the bi-linear interpolation method, G(4,1)=3/8*G(8,1)+5/8*G(8,1) and G(4,8)=3/8*G(8,8)+5/8*G(1,8), in which G(4,1) and G(4,8) require the same calculations. Moreover, G(4,3)=2/8*G(4,8)+6/8*G(4,1) and G(4,4)=3/8*G(4,8)+5/8*G(4,1). Therefore, if subsequent calculations suitably selects P as powers of 2, for example P=8, 16, . . . 128 . . . , then the gain of each pixel may be determined by calculation by shift adders using the previous pixel and the heads and tails of each row. Moreover, if Q is suitably selected as powers of 2 or integer sums of powers of 2, for example Q=192, 192=$2^7$+$2^6$, then the gains of the heads and tails of each row may be determined by shift adders using the gains of the corners and the heads and tails of the previous row. The entire gain evaluation process, therefore, does not require a multiplier, and accordingly a calculation complexity and a circuit cost are lowered.

Figure 5:
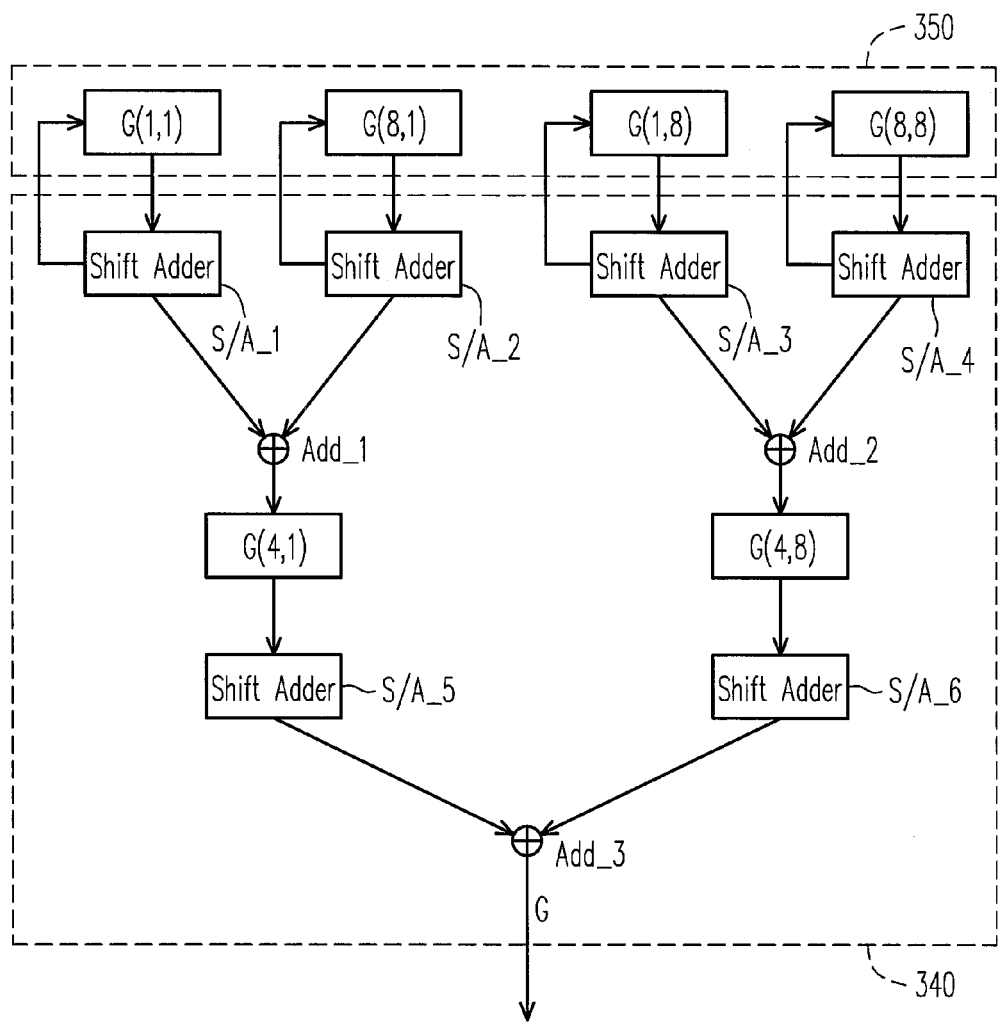
FIG. 5 schematic diagram illustrating a circuit configuration of a calculating unit circuit according to an exemplary embodiment.

FIG. 5 is a schematic diagram illustrating a circuit configuration of a calculating unit according to an exemplary embodiment. Please refer to FIGS. 3A, 3B, 4, and 5 in the description hereafter. The memory unit 350 includes four stored gains G(1,1), G(1,8), G(8,1), and G(8,8), respectively, of the predetermined positions. The calculating unit 340 includes shift adders S/A_1 to S/A_6 and adders Add_1 to Add_3. The shift adder S/A_1 is coupled to the memory unit storing the gain G(1,1), the shift adder S/A_2 is coupled to the memory unit storing the gain G(8,1), the shift adder S/A_3 is coupled to the memory unit storing the gain G(1,8), and the shift adder S/A_4 is coupled to the memory unit storing the gain G(8,8). The adder Add_1 is coupled to the shift adders S/A_1 and S/A_2, the adder Add_2 is coupled to the shift adders S/A_3 and S/A_4, and the adder Add_3 is coupled to the shift adders S/A_5 and S/A_6.

As shown in the present embodiment, the known gains G(1,1) and G(8,1) are respectively shifted and accumulated using the shift adders S/A_1 and S/A_2, so as to determine the gain G(4,1). Similarly, the known gains G(1,8) and G(8,8) are respectively shifted and accumulated using the shift adders S/A_3 and S/A_4, so as to determine the gain G(4,8). The gains G(4,1) and G(4,8) are respectively shifted and accumulated using the shift adders S/A_5 and S/A_6, so as to determine the desired gains G(4,3) and G(4,4) of the positions Se(4,3) and Se(4,4).

In another embodiment which may be obtained by arranging the foregoing calculation, the calculating unit may include a first shift adder, a second shift adder, a third shift adder, a fourth shift adder, a first adder, a second adder, a fifth shift adder, a sixth shift adder, and a third adder. The first shift adder is coupled to the memory unit storing the gain G(1,1), and the first shift adder is adapted for shifting and accumulating according to the y position of the image sensing element Se(x,y) as a control parameter, and according to the gain G(1,1). The second shift adder is coupled to the memory unit storing the gain G(1,Q), and the second shift adder is adapted for shifting and accumulating according to the y position of the image sensing element Se(x,y) as the control parameter, and according to the gain G(1,Q). The third shift adder is coupled to the memory unit storing the gain G(P,1), and the third shift adder is adapted for shifting and accumulating according to the y position of the image sensing element Se(x,y) as the control parameter, and according to the gain G(P,1). The fourth shift adder is coupled to the memory unit storing the gain G(P,Q), and the fourth shift adder is adapted for shifting and accumulating according to the y position of the image sensing element Se(x,y) as the control parameter, and according to the gain G(P,Q).

The first adder is coupled to the first and second shift adders, and the first adder is adapted for adding the outputs of the first and second shift adders. The second adder is coupled to the third and fourth shift adders, and the second adder is adapted for adding the outputs of the third and fourth shift adders. The fifth shift adder is coupled to the first adder, and the fifth shift adder is adapted for shifting and accumulating according to the x position of the image sensing element Se(x,y) as the control parameter, and according to the output of the first adder. The sixth shift adder is coupled to the second adder, and the sixth shift adder is adapted for shifting and accumulating according to the x position of the image sensing element Se(x,y) as the control parameter, and according to the output of the second adder. The third adder is coupled to the fifth and sixth shift adders, and the third adder is adapted for adding the outputs of the fifth and sixth shift adders, so as to determine the gain G(x,y).

In view of the foregoing description, the controller 300 is adapted for controlling the calculating unit 340 in all of the analog-to-digital converters ADC(i,j) of the image pickup apparatus to concurrently perform the same evaluations based on the predetermined parameters of the sensor block SB(i,j). For example, concurrent evaluations are carried out on shift adders or adders. The analog-to-digital converter ADC(i,j) may be electrically connected to the coupled sensing block SB(i,j) through a through silicon via (TSV), a redistribution layer (RDL), or a microbump.

In other words, the analog-to-digital converter ADC(i,j) obtains an image data Data(x,y) from the image sensing element Se(x,y) of the sensor block SB(i,j), evaluates the gain G(x,y) based on the position of the image sensing elements Se(x,y), and outputs a compensated image data $Data_{com}(x,y)$, in which $Data_{com}(x,y)=Data(x,y) \times G(x,y)$. The aforementioned multiplication operation in the present embodiment may be implemented by a digital logic operation or an analog logic operation. As such, the image data Data(x,y) may be an analog signal or a digital signal.

In addition, the schematic perspective diagram in FIG. 2A of the image pickup apparatus according to an exemplary embodiment merely illustrated one possible improvement scheme of the optical shading problem. Accordingly, only a selective embodiment was disclosed, which should not be construed as a limitation to scope of the disclosure. As such, the sensor array and the analog-to-digital converters are not limited to being in or arranged as a rectangular shape. In other words, the only requirements are an image pickup layer and an analog-to-digital conversion layer. The image pickup layer includes a plurality of image pickup areas, and each of the image pickup areas includes a plurality of image sensing elements. The analog-to-digital conversion layer is located at another side of an illuminated side of the image pickup layer, and the analog-to-digital conversion layer includes a plurality of analog-to-digital converters (ADCs). Each of the ADCs is coupled to one of the image pickup areas, and each of the ADCs obtains an image data from the image sensing element in the coupled image pickup area. Moreover, each of the ADCs evaluates a gain based on the position of the image sensing element of the image data, and multiplies the image data by the gain, so as to obtain a compensated image data. The afore-described apparatus contains the spirit of an exemplary embodiment.

Figure 6:
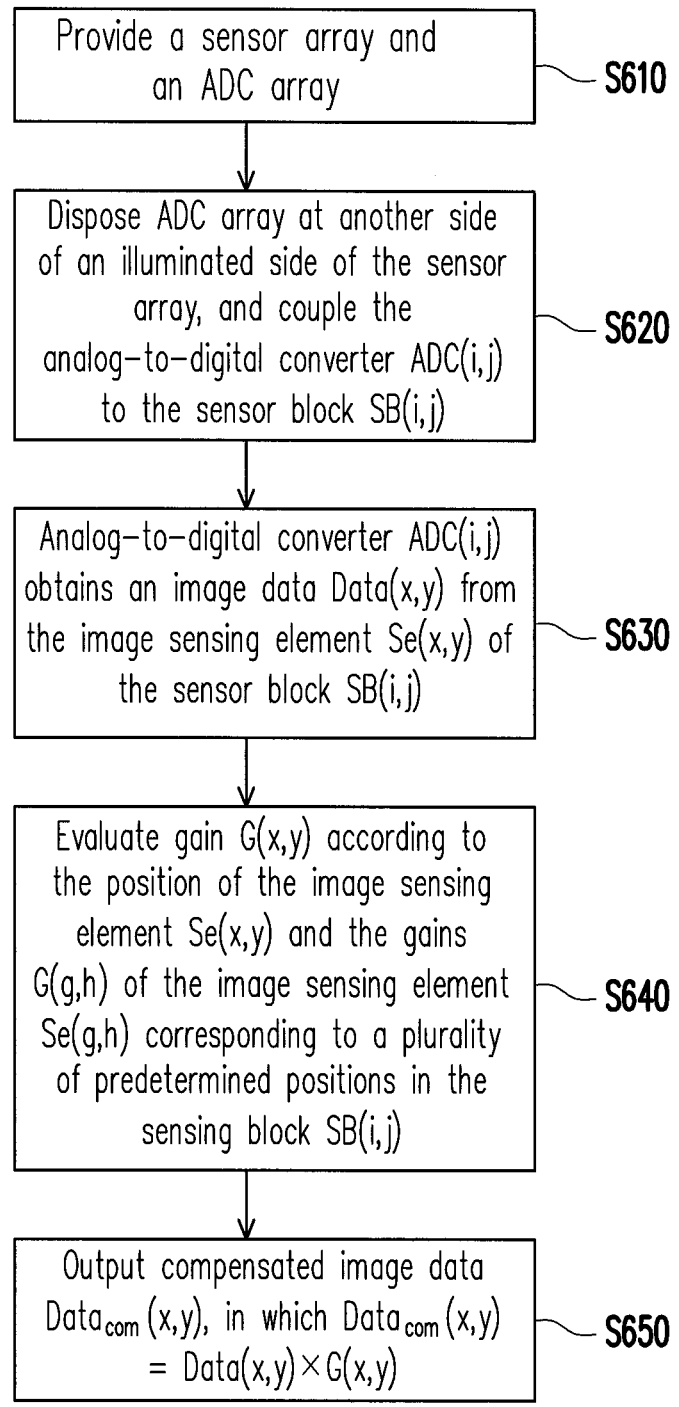
FIG. 6 is a flow chart illustrating the steps of an image pickup method according to an exemplary embodiment.

From another perspective, FIG. 6 is a flow chart illustrating the steps of an image pickup method according to an exemplary embodiment. Please refer to FIG. 6 in the description hereafter. As shown in a Step S610, a sensor array and an ADC array are provided. The sensor array includes M×N sensor blocks which may be indicated by SB(i,j). Each of the sensor blocks includes P×Q image sensing elements which may be indicated by Se(x,y), in which M and N are integers greater than 1, P, Q, i, j, x, and y are integers greater than or equal to 1, i is less than or equal to M, j is less than or equal to N, x is less than or equal to P, and y is less than or equal to Q. The ADC array includes M×N analog-to-digital converters indicated by ADC(i,j).

Thereafter, in a Step S620, the ADC array is disposed at another side of an illuminated side of the sensor array, and the analog-to-digital converter ADC(i,j) is coupled to the sensor block SB(i,j). Accordingly, in a Step S630, the analog-to-digital converter ADC(i,j) may obtain an image data Data(x,y) from the image sensing element Se(x,y) of the sensor block SB(i,j). Thereafter, in a Step S640, a gain G(x,y) is evaluated according to the position of the image sensing element Se(x, y) and the gains G(g,h) of the image sensing element Se(g,h) corresponding to a plurality of predetermined positions in the sensing block SB(i,j). As shown in a Step S640, a compensated image data $Data_{com}(x,y)$ is outputted, in which $Data_{com}(x,y)=Data(x,y)\times G(x,y)$. Details of this embodiment have been described in the earlier embodiments and are not repeated hereinafter.

Figure 7:
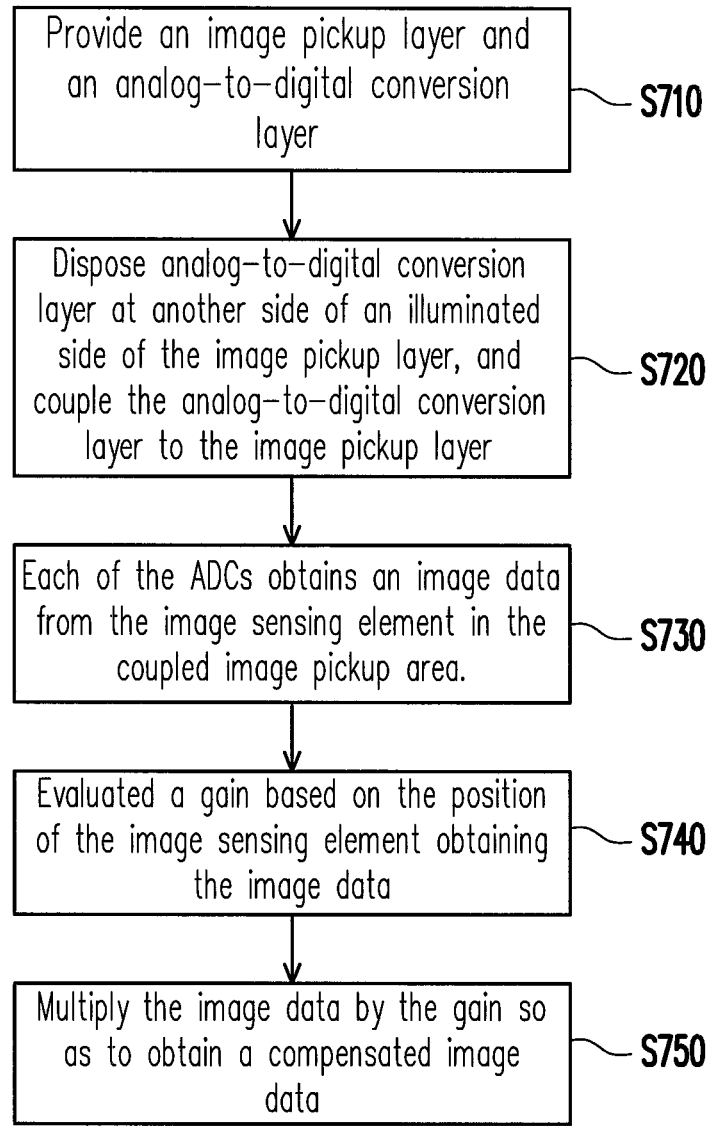
FIG. 7 is a flow chart illustrating the steps of an image pickup method according to an exemplary embodiment.

From another perspective, FIG. 7 is a flow chart illustrating the steps of an image pickup method according to an exemplary embodiment. Please refer to FIG. 7 in the description hereafter. As shown in a Step S710, an image pickup layer and an analog-to-digital conversion layer are provided. The image pickup layer includes a plurality of image pickup areas, and each of the image pickup areas includes a plurality of image sensing elements. The analog-to-digital conversion layer includes a plurality of ADCs. Thereafter, as shown in a Step S720, the analog-to-digital conversion layer is disposed at another side of an illuminated side of the image pickup layer, and the analog-to-digital conversion layer is coupled to the image pickup layer. Accordingly, in a Step S730, each of the ADCs obtains an image data from the image sensing element in the coupled image pickup area.

Thereafter, in a Step S740, a gain is evaluated based on the position of the image sensing element obtaining the image data. As shown in a Step S750, the image data is multiplied by the gain, so as to obtain a compensated image data. Details of this embodiment have been described in the earlier embodiments and are not repeated hereinafter.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image pickup apparatus, comprising:
a sensor array comprising M×N sensor blocks indicated by SB(i,j), each of the sensor blocks comprising P×Q image sensing elements indicated by Se(x,y), wherein M and N are integers greater than 1, P, Q, i, j, x, and y are integers greater than or equal to 1, i is less than or equal to M, j is less than or equal to N, x is less than or equal to P, and y is less than or equal to Q; and
an analog-to-digital converter array located at another side of an illuminated side of the sensor array, the analog-to-digital converter array comprising M×N analog-to-digital converters indicated by ADC(i,j), the analog-to-digital converter ADC(i,j) coupled to the sensor block SB(i,j), and the analog-to-digital converter ADC(i,j) obtains an image data Data(x,y) from the image sensing element Se(x,y) of the sensor block SB(i,j), evaluates a gain G(x,y) based on the position of the image sensing element Se(x,y), and outputs a compensated image data Datacom(x,y), wherein $$Datacom(x,y)=Data(x,y)\times G(x,y),$$

wherein the analog-to-digital converter ADC(i,j) comprises:
a plurality of memory units adapted for storing the gains G(g,h) of the image sensing elements Se(g,h) corresponding to predetermined positions in the sensor block SB(i,j), wherein g and h are integers greater than or equal to 1, g is less than or equal to P, and h is less than or equal to Q; and a calculating unit coupled to the memory units, adapted for evaluating the gain G(x,y) according to the stored values of the memory units and the position of the image sensing element Se(x,y),
wherein the memory units store four gains G(1,1), G(P,1), G(1,Q), and G(P,Q) of the image sensing elements Se(1,1), Se(P,1), Se(1,Q), and Se(P,Q) corresponding to the four corners of the sensor block SB(i,j),
wherein the calculating unit comprises:
a first shift adder coupled to the memory unit storing the gain G(1,1), adapted for shifting and accumulating according to the y position of the image sensing element Se(x,y) as a control parameter, and according to the gain G(1,1);
a second shift adder coupled to the memory unit storing the gain G(1,Q), adapted for shifting and accumulating according to the y position of the image sensing element Se(x,y) as the control parameter, and according to the gain G(1,Q);
a third shift adder coupled to the memory unit storing the gain G(P,1), adapted for shifting and accumulating according to the y position of the image sensing element Se(x,y) as the control parameter, and according to the gain G(P,1);
a fourth shift adder coupled to the memory unit storing the gain G(P,Q), adapted for shifting and accumulating according to the y position of the image sensing element Se(x,y) as the control parameter, and according to the gain G(P,Q);
a first adder coupled to the first and second shift adders, adapted for adding the outputs of the first and second shift adders;
a second adder coupled to the third and fourth shift adders, adapted for adding the outputs of the third and fourth shift adders;
a fifth shift adder coupled to the first adder, adapted for shifting and accumulating according to the x position of the image sensing element Se(x,y) as the control parameter, and according to the output of the first adder;
a sixth shift adder coupled to the second adder, adapted for shifting and accumulating according to the x position of the image sensing element Se(x,y) as the control parameter, and according to the output of the second adder; and
a third adder coupled to the fifth and sixth shift adders, adapted for adding the outputs of the fifth and sixth shift adders, so as to determine the gain G(x,y).

2. The image pickup apparatus as claimed in claim 1, further comprising:
a controller adapted for controlling the calculating unit in the analog-to-digital converter ADC(i,j) to concurrently perform the same evaluation based on the gains G(g,h) of the image sensing elements Se(g,h) corresponding to predetermined positions of the sensor block SB(i,j).

3. The image pickup apparatus as claimed in claim 1, wherein the analog-to-digital converter ADC(i,j) is electrically connected to the coupled sensing block SB(i,j) through a through silicon via, a redistribution layer, or a microbump.

4. An image pickup apparatus, comprising:
an image pickup layer comprising a plurality of image pickup areas, each of the image pickup areas comprising a plurality of image sensing elements; and
an analog-to-digital conversion layer located at another side of an illuminated side of the image pickup layer, the analog-to-digital conversion layer comprising a plurality of analog-to-digital converters, each of the analog-to-digital converters coupled to one of the image pickup areas, and each of the analog-to-digital converters obtains an image data from the image sensing element in the coupled image pickup area, evaluates a gain based on the position of the image sensing element of the image data, and multiplies the image data by the gain so as to obtain a compensated image data, wherein each of the analog-to-digital converter comprises:

a plurality of memory units adapted for storing the gains G(g,h) of the image sensing elements Se(g,h) corresponding to predetermined positions in the sensor block SB(i,j), wherein g and h are integers greater than or equal to 1, g is less than or equal to P, and h is less than or equal to Q; and a calculating unit coupled to the memory units, adapted for evaluating the gain G(x,y) according to the stored values of the memory units and the position of the image sensing element Se(x,y), wherein the memory units store four gains G(1,1), G(P,1), G(1,Q), and G(P,Q) of the image sensing elements Se(1, 1), Se(P,1), Se(1,Q), and Se(P,Q) corresponding to the four corners of the sensor block SB(i,j), wherein the calculating unit comprises:

a first shift adder coupled to the memory unit storing the gain G(1,1), adapted for shifting and accumulating according to the y position of the image sensing element Se(x,y) as a control parameter, and according to the gain G(1,1);

a second shift adder coupled to the memory unit storing the gain G(1,Q), adapted for shifting and accumulating according to the y position of the image sensing element Se(x,y) as the control parameter, and according to the gain G(1,Q);

a third shift adder coupled to the memory unit storing the gain G(P,1), adapted for shifting and accumulating according to the y position of the image sensing element Se(x,y) as the control parameter, and according to the gain G(P,1);

a fourth shift adder coupled to the memory unit storing the gain G(P,Q), adapted for shifting and accumulating according to the y position of the image sensing element Se(x,y) as the control parameter, and according to the gain G(P,Q);

a first adder coupled to the first and second shift adders, adapted for adding the outputs of the first and second shift adders;

a second adder coupled to the third and fourth shift adders, adapted for adding the outputs of the third and fourth shift adders;

a fifth shift adder coupled to the first adder, adapted for shifting and accumulating according to the x position of the image sensing element Se(x,y) as the control parameter, and according to the output of the first adder;

a sixth shift adder coupled to the second adder, adapted for shifting and accumulating according to the x position of the image sensing element Se(x,y) as the control parameter, and according to the output of the second adder; and a third adder coupled to the fifth and sixth shift adders, adapted for adding the outputs of the fifth and sixth shift adders, so as to determine the gain G(x,y).

5. The image pickup apparatus as claimed in claim 4, wherein the analog-to-digital conversion layers are electrically connected to the coupled image pickup area through a through silicon via, a redistribution layer, or a microbump.

6. An image pickup method, comprising:

providing an image pickup layer and an analog-to-digital conversion layer, the image pickup layer comprising a plurality of image pickup areas, each of the image pickup areas comprising a plurality of image sensing elements, and the analog-to-digital conversion layer comprises a plurality of analog-to-digital converters;

disposing the analog-to-digital conversion layer at another side of an illuminated side of the image pickup layer, and coupling the analog-to-digital conversion layer to the image pickup layer;

each of the analog-to-digital converters obtaining an image data from the image sensing element in the coupled image pickup area;

evaluating a gain based on the position of the image sensing element obtaining the image data; and multiplying the image data by the gain, so as to obtain a compensated image data, wherein each of the analog-to-digital converter comprises:

a plurality of memory units adapted for storing the gains G(g,h) of the image sensing elements Se(g,h) corresponding to predetermined positions in the sensor block SB(i,j), wherein g and h are integers greater than or equal to 1, g is less than or equal to P, and h is less than or equal to Q; and a calculating unit coupled to the memory units, adapted for evaluating the gain G(x,y) according to the stored values of the memory units and the position of the image sensing element Se(x,y), wherein the memory units store four gains G(1,1), G(P,1), G(1,Q), and G(P,Q) of the image sensing elements Se(1, 1), Se(P,1), Se(1,Q), and Se(P,Q) corresponding to the four corners of the sensor block SB(i,j), wherein the calculating unit comprises:

a first shift adder coupled to the memory unit storing the gain G(1,1), adapted for shifting and accumulating according to the y position of the image sensing element Se(x,y) as a control parameter, and according to the gain G(1,1);

a second shift adder coupled to the memory unit storing the gain G(1,Q), adapted for shifting and accumulating according to the y position of the image sensing element Se(x,y) as the control parameter, and according to the gain G(1,Q);

a third shift adder coupled to the memory unit storing the gain G(P,1), adapted for shifting and accumulating according to the y position of the image sensing element Se(x,y) as the control parameter, and according to the gain G(P,1);

a fourth shift adder coupled to the memory unit storing the gain G(P,Q), adapted for shifting and accumulating according to the y position of the image sensing element Se(x,y) as the control parameter, and according to the gain G(P,Q);

a first adder coupled to the first and second shift adders, adapted for adding the outputs of the first and second shift adders;

a second adder coupled to the third and fourth shift adders, adapted for adding the outputs of the third and fourth shift adders;

a fifth shift adder coupled to the first adder, adapted for shifting and accumulating according to the x position of the image sensing element Se(x,y) as the control parameter, and according to the output of the first adder;

a sixth shift adder coupled to the second adder, adapted for shifting and accumulating according to the x position of the image sensing element Se(x,y) as the control parameter, and according to the output of the second adder; and a third adder coupled to the fifth and sixth shift adders, adapted for adding the outputs of the fifth and sixth shift adders, so as to determine the gain G(x,y).

7. The image pickup method as claimed in claim 6, further comprising:
  storing a predetermined parameter corresponding to the position of the coupled image pickup area; and
  evaluating the gain according to the stored value and the position of the image sensing element obtaining the image data.

* * * * *